United States Patent [19]
Mansion

[11] Patent Number: 6,115,734
[45] Date of Patent: Sep. 5, 2000

[54] METHOD OF DYNAMICALLY ALLOCATING TASKS TO EVENTS ARRIVING ON A SET OF QUEUES

[75] Inventor: Jean-Louis Mansion, Marly le Roi, France

[73] Assignee: Alcatel, Paris, France

[21] Appl. No.: 08/851,514

[22] Filed: May 5, 1997

[30] Foreign Application Priority Data

May 2, 1997 [FR] France .................................. 97 05454

[51] Int. Cl.$^7$ .............................. G06F 9/00; G06F 9/46
[52] U.S. Cl. ........................................................ 709/107
[58] Field of Search .................................. 395/672, 673; 709/107, 103, 300, 102

[56] References Cited

U.S. PATENT DOCUMENTS 5,528,513  6/1996  Vaitzblit et al. ........................ 364/514
5,566,337  10/1996  Szymanski et al. .................... 395/733

FOREIGN PATENT DOCUMENTS 0 466 948 A1  1/1992  European Pat. Off. .
2 012 084    7/1879  United Kingdom .
WO 94/20904  9/1994  WIPO .

OTHER PUBLICATIONS

IBM Corporation. "MQSeries Application Programming Guide". Chapter 1, Section 4:MQM Objects, First Edition (Dec. 1993).
IBM. "MQSeries Application Programming Guide", Fifth edition, Sep. 1995.
IBM. "MQSeries Message Queue Interface Technical Reference", Apr. 1993.
IBM. "MQSeries Distributed Queuing Guide", Sep. 1995.
Dick Pountain, "The Chorus Microkemel"*BYTE*, vol. 19, No. 1, Jan. 1994,, Peterborough, NH, pp. 131–136.

*Primary Examiner*—Alvin E. Oberley
*Assistant Examiner*—Lewis A. Bullock, Jr.
*Attorney, Agent, or Firm*—Sughrue, Mion, Zinn, Macpaek & Seas, PLLC

[57] ABSTRACT

A method of managing a system comprising a plurality of queues ($F_1, F_2, F_3, \ldots F_n$) in which events are inserted by a transmitter (E), and a set of tasks ($T_1, T_2, T_3, \ldots T_n$) that consume said events, the method being characterized in that each queue is associated with an indirection identifier ($I_1, I_2, I_3, \ldots I_n$) and in that each time a transmitter seeks to insert a new event (e) in a queue, it consults the state of the indirection identifier, and where appropriate, inserts a "substitution" event (s) containing an identifier of said queue containing the new event in the queue indicated by said indirection identifier.

4 Claims, 2 Drawing Sheets

METHOD OF DYNAMICALLY ALLOCATING TASKS TO EVENTS ARRIVING ON A SET OF QUEUES

The present invention relates to a method of dynamically allocating tasks to events arriving on a set of queues within a data processing system. The term "event" is used for a message that can arise asynchronously and that may contain a certain number of parameters.

An application of the invention lies in the field of managing telecommunications networks by means of a data processing system. Each queue then corresponds to a call managed by the system. Within a given call, various events can arise such as dialing, transmission of a data packet, etc. These events are stored, as they arrive, in the queue corresponding to a particular call.

It will be understood that in such a configuration, the number of queues can be become very large.

Although particularly applicable to the field of managing telecommunications networks, the present invention is entirely general in scope and therefore capable of being applied to numerous technical fields where the problem of managing a large set of queues arises.

These events that require processing will be consumed by the data processing system: i.e., each event inserted in a queue is processed by the system and is then removed from the queue.

In conventional manner, the data processing system for consuming events inserted in queues is of the multitasking type.

A task can be defined as an elementary execution unit. It is commonplace to distinguish the notion of "task" and the notion of "process". A process comprises one or more tasks together with an execution context and a stack, i.e., a set of data items that are useful for performing the tasks contained in the process.

In conventional operating systems such as Unix, a process contains a single task. Nevertheless, there exists more recent systems, such as the Chorus microkernel system from "Chorus System", in which a process may contain a plurality of tasks, which are generally referred to as "threads".

FIG. 1 shows the context in which the present invention is applicable in a more technical manner. Transmitters, such as processes external to the system of the invention, insert events in a plurality of queues $(F_1, F_2, F_3, \ldots, F_n)$. These events require processing which is performed by a set of tasks $(T_1, T_2, T_3, \ldots, T_q)$. It will be understood that in such a configuration, the number of tasks must be appropriate for the rate at which events arrive for processing and for the number $\underline{n}$ of queues.

A first approach for ensuring that the events arriving in queues are processed appropriately by the tasks consist in allocating one task per queue (such that the values of $\underline{n}$ and $\underline{q}$ are equal).

Nevertheless, that solution cannot be reasonably employed in certain cases, particularly when the number of queues is large. This is because of several reasons relating to computer implementation of a task in a data processing system:

Each task occupies a certain amount of memory, in particular because it must store its execution context, and, above all, its stack. As the number of tasks increases, the total amount of memory required can become prohibitive.

Also, in conventional manner, the underlying operating system updates a table referencing all of the resources of the system, and in particular its tasks. Thus, with an increasing number of tasks, the resource table that the system needs to manage increases in size, such that any action requiring access to said table (election of a task, communication between two tasks on a common processor, . . . ) becomes expensive in time.

The object of the present invention is to propose a method that does not suffer from those drawbacks. More precisely, the method of the invention makes it possible to manage $\underline{n}$ queues and $\underline{q}$ tasks with q<n.

To do this, the method of the invention is characterized in that each queue is associated with an indirection identifier and in that each time a transmitter seeks to insert a new event in a queue, it consults the state of said indirection identifier, and where appropriate, inserts a "substitution" event containing an identifier of said queue in the queue indicated by said indirection identifier.

The characteristics and advantages of the present invention appear more clearly from the following description given with reference to the accompanying figures.

FIG. 1, already described above, shows the general context in which the present invention applies.

FIG. 2A shows a plurality of queues $F_1, F_2, F_3, \ldots, F_n$, each queue being associated with a respective indirection identifier $I_1, I_2, I_3, \ldots, I_n$.

Figure 1:
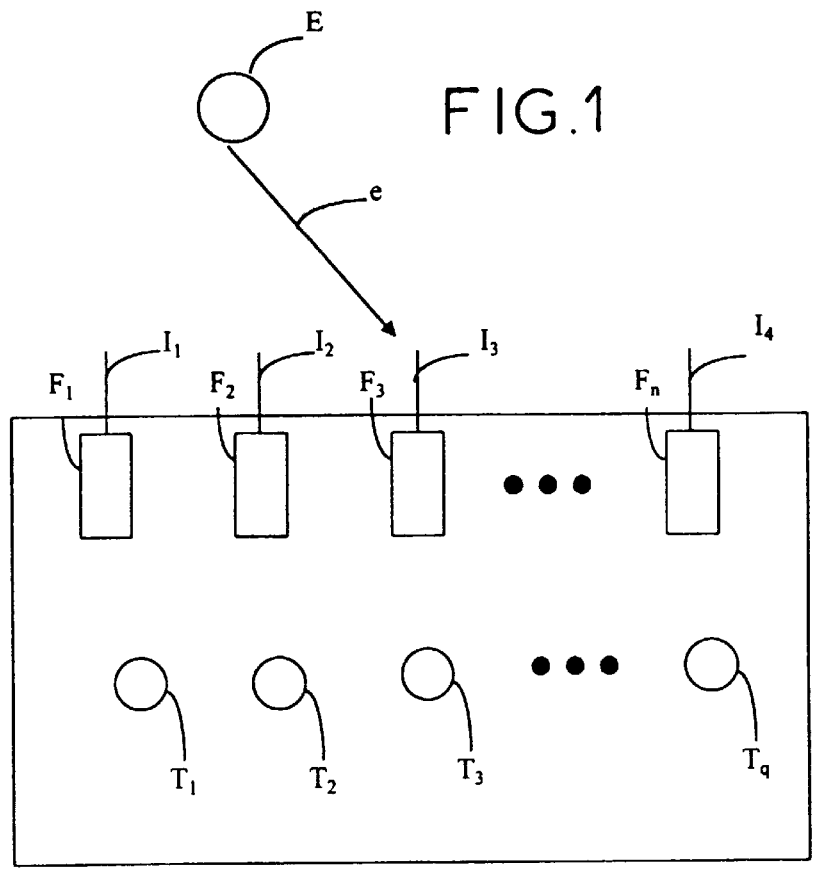

When a transmitter E inserts an event e in a queue ($F_2$, for example), it consults the state of the indirection identifier associated therewith ($I_2$ in this example). If this indirection identifier contains an identifier of another queue ($F_1$ in the example shown in FIG. 1), the transmitter must insert an event s, called a "substitution" event, in said other queue.

The substitution event s contains an identifier of the originating queue, i.e., the queue in which the event e has been inserted ($F_2$ in this example).

In a particular implementation, the substitution event s may also contain a priority.

A task processing the events contained in a queue is thus confronted with two types of events:

substitution events; and so-called "normal" events.

The order in which the tasks process the events inserted in the queues can be implemented according to specific variations of the present invention.

Thus, the queues may be of the first in, first out type (FIFO type). Under such circumstances, the tasks process events in their order of arrival.

The possibility can also include a variation whereby tasks generate independently both normal events and substitution events. For example, a task connected to a queue initially processes all of the normal events inserted in the queue, after which it changes queue by processing a substitution event.

In the above-mentioned implementation in which substitution events contain a priority set by the transmitter, tasks process events in the order set by such priorities.

When a task is to process a substitution event, it must read the corresponding event in the queue whose reference is given as a parameter of the substitution event. It also positions the indirection identifier associated with its originating queue so that any event inserted therein by a transmitter gives rise to a substitution event on the designation queue.

Figure 2A:
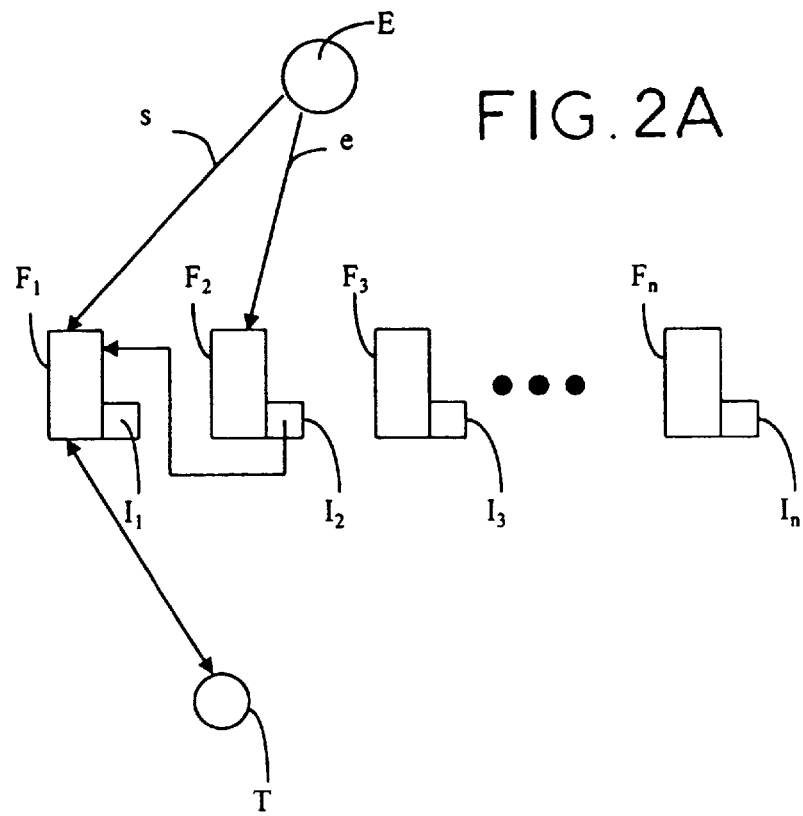
FIGS. 2A and 2B illustrate the method of the invention by means of an example.
Figure 2B:
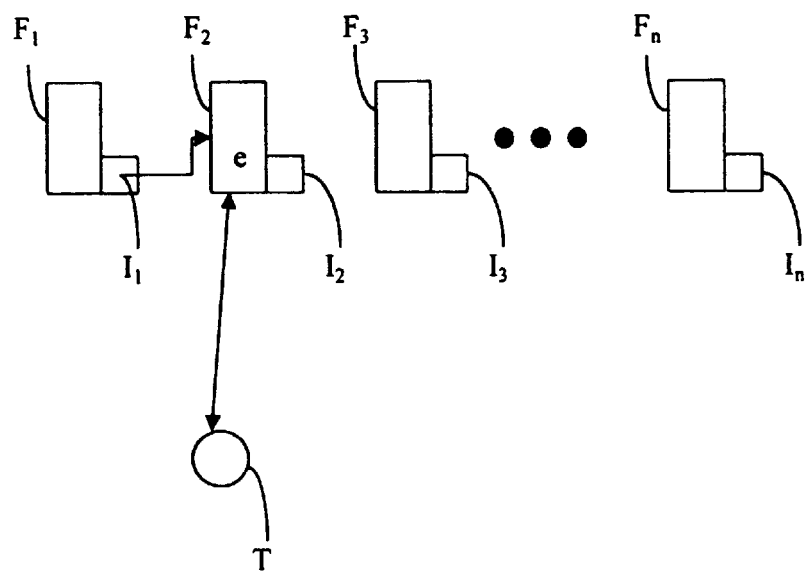

In the example shown in FIG. 2B, task T receives a substitution event s and decides to process it. For this purpose, it connects itself to the queue $F_2$ whose identifier is contained in the parameters of the substitution event s, and it updates the indirection identifiers $I_1$ and $I_2$ such that $I_1$ mentions $F_2$ and $I_2$ mentions that the queue $F_2$ no longer requires substitution events to be sent thereto.

It can then read the contents of the event e contained in $F_2$, and process it.

Each time a new event arrives on queue $F_1$, a substitution event is sent to $F_2$, thereby informing the task T.

Figure 3:
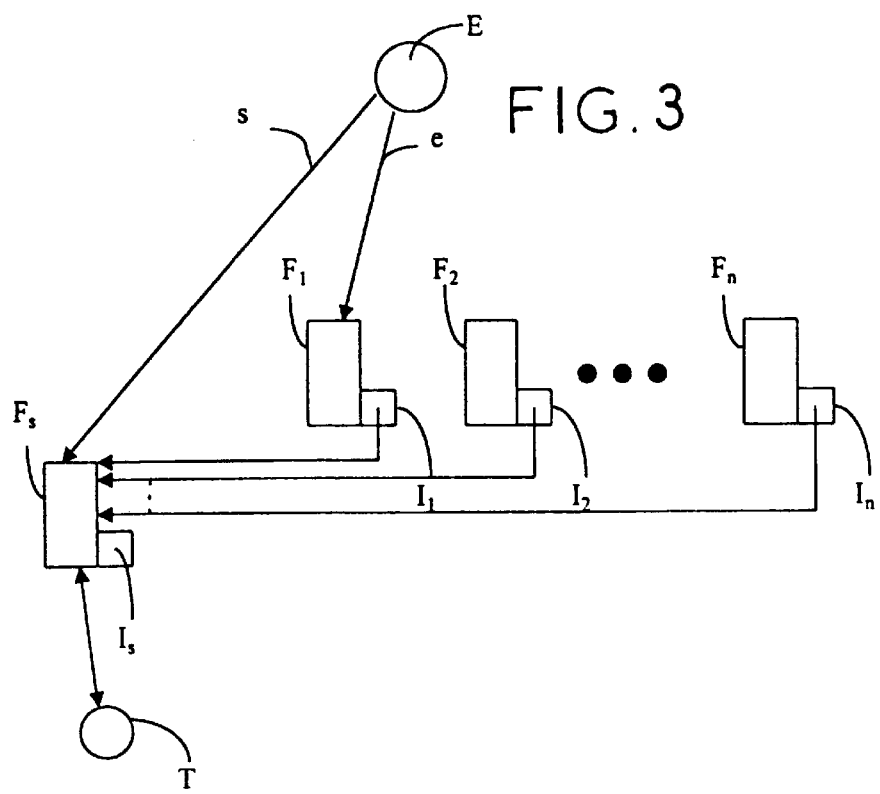
FIG. 3 shows a particular implementation of the method of the invention.

FIG. 3 shows a particular implementation in which one of the queues is dedicated to substitution events.

All of the tasks that are available, i.e., all of the tasks that are not processing a particular event in some queue, are connected to the queue $F_s$, which is dedicated to substitution events. In the same manner, all of the indirection identifiers associated with queues that are not being processed by some task contain the identifier of the queue $F_s$ that is dedicated to substitution events.

When a task has finished processing the event(s) inserted on a particular queue, it reconnects itself to the queue that is dedicated to substitution events, $F_s$.

Naturally, numerous other options exist for implementing the invention. In particular, it is possible to associate a group of queues to one task. In any event, the present invention is not limited to any one such possibility, but to the general mechanism as presented in the claims.

I claim:

1. A method of managing a system, said system comprising a plurality of queues in which events are inserted by a set of transmitters, and a set of tasks that consume said events, wherein each queue is associated with an indirection identifier, said method comprising the step of:

each time one of said transmitters seeks to insert a new event in a first queue, said transmitter consulting the state of the indirection identifier associated with said first queue, and when said indirection identifier associated with said first queue contains an identifier of a second queue, said transmitter inserting a "substitution" event containing an identifier of said first queue in said second queue indicated by said indirection identifier associated with said first queue.

2. A method according to claim 1, wherein said queues are of the first in, first out (FIFO) type.

3. A method according to claim 1, wherein said substitution events contain a priority, and wherein said tasks process the events inserted in said queues in an order set by said priorities.

4. A method according to claim 1, further comprising the step of, when one of said tasks receives one of said substitution events, updating indirection identifiers for each of said first queue and said second queue, respectively.

* * * * *